(12) United States Patent
Alex et al.

(10) Patent No.: US 11,538,133 B1
(45) Date of Patent: Dec. 27, 2022

(54) TIME ALIGNMENT FOR WIRELESS AR/VR

(71) Applicant: Meta Platforms Technologies, LLC, Menlo Park, CA (US)

(72) Inventors: Sam Padinjaremannil Alex, Dublin, CA (US); Nabeel Ahmed, San Jose, CA (US); William Louis Abbott, Portola Valley, CA (US); Fabrizio Guerrieri, Santa Clara, CA (US); Payam Torab Jahromi, Laguna Niguel, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 67 days.

(21) Appl. No.: 16/941,306

(22) Filed: Jul. 28, 2020

Related U.S. Application Data

(60) Provisional application No. 62/926,796, filed on Oct. 28, 2019.

(51) Int. Cl.
  *G06T 1/20* (2006.01)
  *H04W 56/00* (2009.01)
  *H04W 72/12* (2009.01)
  *G06F 3/14* (2006.01)

(52) U.S. Cl.
  CPC ............. *G06T 1/20* (2013.01); *H04W 56/001* (2013.01); *H04W 72/12* (2013.01); *G06F 3/14* (2013.01)

(58) Field of Classification Search
  CPC ...... G06T 1/20; H04W 56/001; H04W 72/12; G06F 3/147; G06F 3/14
  See application file for complete search history.

(56) References Cited

U.S. PATENT DOCUMENTS

| | | | |
|---|---|---|---|
| 5,867,483 A | 2/1999 | Ennis, Jr. et al. | |
| 7,801,104 B2 | 9/2010 | Gaur | |
| 2014/0321423 A1 | 10/2014 | Kalhan | |
| 2016/0345318 A1* | 11/2016 | Bhandaru | H04L 67/141 |
| 2017/0041929 A1 | 2/2017 | Noh et al. | |
| 2018/0270175 A1* | 9/2018 | Kim | G10L 15/22 |
| 2019/0191376 A1 | 6/2019 | Kim et al. | |
| 2019/0363843 A1 | 11/2019 | Gordaychik | |
| 2020/0100197 A1 | 3/2020 | Pan et al. | |
| 2021/0076251 A1 | 3/2021 | Ho et al. | |
| 2021/0120507 A1 | 4/2021 | De La Cruz et al. | |

FOREIGN PATENT DOCUMENTS

WO  WO-2019143189 A1 * 7/2019  ............. G06F 3/011

* cited by examiner

*Primary Examiner* — Keith Ferguson
(74) *Attorney, Agent, or Firm* — Foley & Lardner LLP

(57) ABSTRACT

Disclosed herein are related to a system and a method of time alignment in an AR/VR environment. In one approach, a device including a console or head wearable display (HWD) may determine a wireless transfer window corresponding to a wireless data transmission between the HWD and the console. The device may determine one or more first processes to be performed by the device to enable the wireless data transmission. The device may schedule the one or more first processes according to the wireless transfer window. The device may perform the wireless data transmission within the wireless transfer window responsive to the one or more first processes.

20 Claims, 8 Drawing Sheets

TIME ALIGNMENT FOR WIRELESS AR/VR

CROSS-REFERENCE TO RELATED APPLICATION

This application claims priority to U.S. Provisional Patent Application No. 62/926,796, filed Oct. 28, 2019, which is incorporated by reference in its entirety for all purposes.

FIELD OF DISCLOSURE

The present disclosure is generally related to communication for rendering artificial reality, including but not limited to time alignment for wireless augmented reality (AR) or virtual reality (VR) to meet both high throughput and low latency.

BACKGROUND

Artificial reality such as AR, VR, or mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method of time alignment for AR/VR applications. In some embodiments, the method may include determining, by a device comprising at least one of a console or a head wearable display (HWD), a wireless transfer window corresponding to a wireless data transmission between the HWD and the console. The method may include determining, by the device, one or more first processes to be performed by the device to enable the wireless data transmission. The method may include scheduling, by the device, the one or more first processes according to the wireless transfer window. The method may include performing, by the device responsive to the one or more first processes, the wireless data transmission within the wireless transfer window.

In some embodiments, the one or more first processes are performed by the HWD and include at least one of a decompression process, a scan-out process or a display process. In some embodiments, the one or more first processes are performed by the console and include at least one of a render central processing unit (CPU) process, a render graphics processing unit (GPU) process, or a compression process. In some embodiments, the method further includes negotiating, by the device, the wireless transfer window with one or more other devices. In some embodiments, the device is a first device, and the method further includes sending, by the first device, at least one of a refresh rate or a transmission rate of the first device to a second device, to schedule a wireless transfer window for the second device. In some embodiments, the second device applies a predefined rule to the refresh rate or the transmission rate, to schedule the wireless transfer window for the second device. In some embodiments, the method further includes receiving, by the device, one or more parameters corresponding to an application or device layer of the device, and setting, by the device, the wireless transfer window according to the one or more parameters. In some embodiments, the wireless transfer window is to be used for at least one application of a plurality of applications executing on the device.

In some embodiments, the one or more first processes correspond to a first application of a plurality of applications executing on the device. The method may include determining, by the device, one or more second processes corresponding to a second application of the plurality of applications executing on the device. Scheduling may include scheduling, by the device, the one or more first processes of the first application and the one or more second processes of the second application according to the wireless transfer window. In some embodiments, the method may further include determining, by the device, one or more second processes to be performed by one of the console or the HWD that is other than the device, following the wireless transfer window. The method may further include scheduling, by the device, the one or more second processes according to the wireless transfer window.

Various embodiments disclosed herein are related to a device for time alignment for AR/VR applications. The device may include at least one processor executing on at least one of a console or a head wearable display (HWD). The at least one processor may be configured to determine a wireless transfer window corresponding to a wireless data transmission between the HWD and the console. The at least one processor may be configured to determine one or more first processes to be performed by the device to enable the wireless data transmission. The at least one processor may be configured to schedule the one or more first processes according to the wireless transfer window. The at least one processor may be configured to perform, responsive to the one or more first processes, the wireless data transmission within the wireless transfer window.

In some embodiments, the one or more first processes are performed by the HWD and include at least one of a decompression process, a scan-out process or a display process. In some embodiments, the one or more first processes are performed by the console and include at least one of a render central processing unit (CPU) process, a render graphics processing unit (GPU) process, or a compression process. In some embodiments, the at least one processor is configured to negotiate the wireless transfer window with one or more other devices. In some embodiments, the device is a first device, and the at least one processor is further configured to send at least one of a refresh rate or a transmission rate of the first device to a second device, to schedule a wireless transfer window for the second device.

In some embodiments, the at least one processor is further configured to receive one or more parameters corresponding to an application or device layer of the device, and set the wireless transfer window according to the one or more parameters. In some embodiments, the wireless transmission window is to be used for at least one application of a plurality of applications executing on the device. In some embodiments, the one or more first processes correspond to a first application of a plurality of applications executing on the device. The at least one processor may be further configured to determine one or more second processes corresponding to a second application of the plurality of applications executing on the device. Scheduling may include scheduling the one or more first processes of the first application and the one or more second processes of the second application according to the wireless transfer window. In some embodiments, the at least one processor is further configured to determine one or more second processes to be performed by one of the console or the HWD that is other than the device, following the wireless transfer window. The at least one processor may be further configured to schedule the one or more second processes according to the wireless transfer window.

Various embodiments disclosed herein are related to a non-transitory computer-readable medium having one or more instructions embodied thereon. The one or more instructions, when executed by a processor, cause the processor to determine, by a device comprising at least one of a console or a head wearable display (HWD), one or more parameters associated with at least one of an application layer or a device layer of the device. The one or more instructions may cause the processor to set, by the device, a wireless transfer window according to the one or more parameters. The wireless transfer window may correspond to a wireless data transmission between the HWD and the console. The one or more instructions may cause the processor to determine, by the device, one or more first processes to be performed by the device to enable the wireless data transmission. The one or more instructions may cause the processor to schedule, by the device, the one or more first processes according to the wireless transfer window. The one or more instructions may cause the processor to perform, by the device responsive to the one or more first processes, the wireless data transmission within the wireless transfer window.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
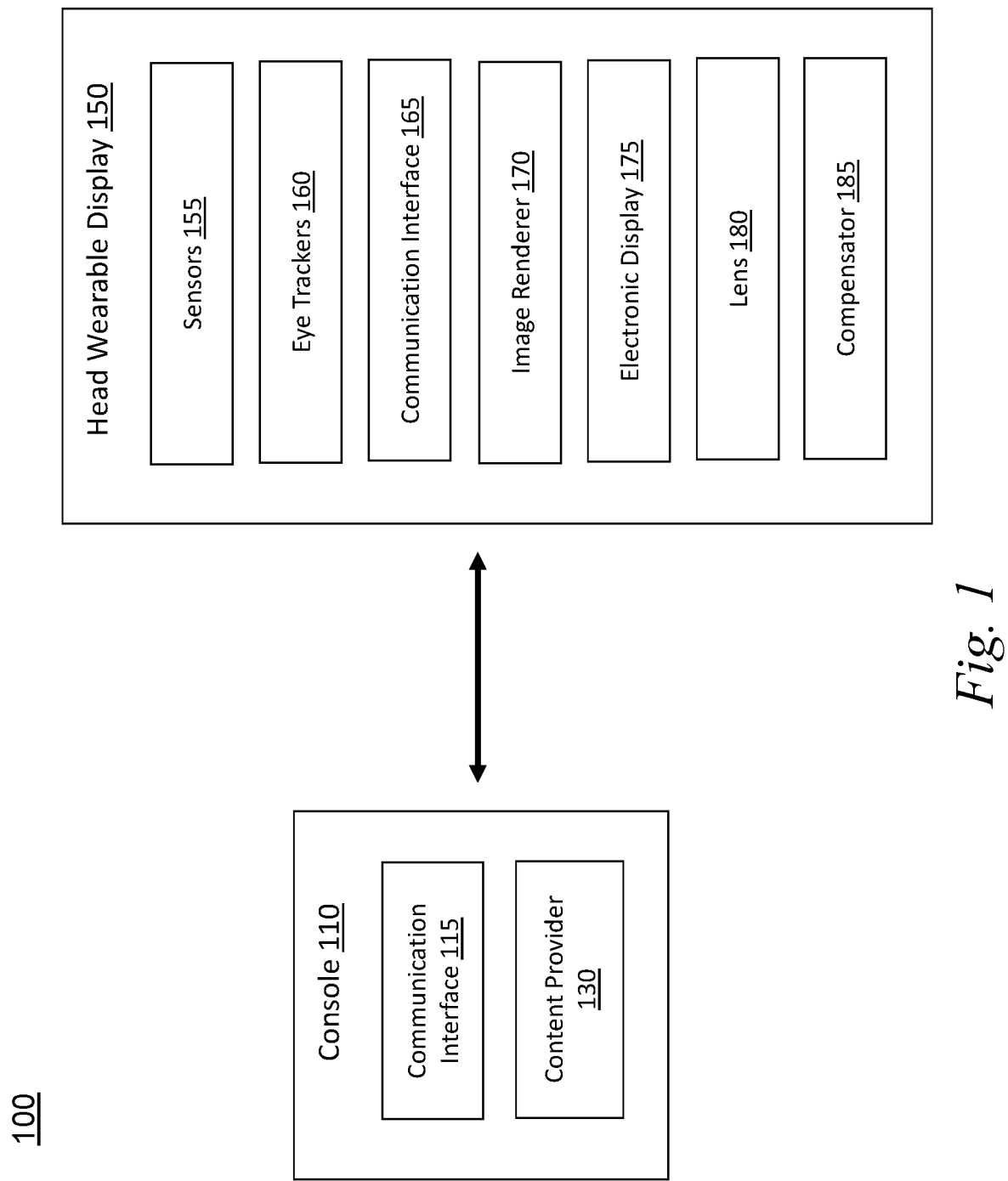
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to systems and methods for communication for rendering artificial reality, including but not limited to systems and methods for time alignment in AR/VR applications to meet both high throughput and low latency.

In some wireless applications, a wireless subsystem operates with its own cadence (e.g., time window, time duration, time intervals, time slots, traffic pattern, execution pipeline) for transmission, independent of other subsystems or a cadence of an application layer for traffic arrival. Since cadences at the application and wireless layer are not synchronized, latency may occur at the application layer, which may be inconsistent in time and typically had a random distribution bounded above the wireless cadence. In some instances, such as where a mode of operation in a wireless system is contention-based, this latency could even be unbounded.

However, such modes of operation were acceptable to many applications, since such applications typically do not have a tight requirement for bounding the latency. However, such requirements change with the advent of AR/VR applications. Merely guaranteeing wireless slot availability at a certain cadence does not optimize the latency to the best possible latency, as the latency would still be a random distribution between zero and the periodicity of slots.

Some systems may generate arbitrary data at an arbitrary or random arrival time. It may be difficult to minimize latency in such systems, because the wireless system must be able to transmit on-demand, which is typically not feasible, especially when shared mediums like a Wi-Fi unlicensed frequency is used. However, some systems, such as AR/VR systems may have a cadence of data transmission/arrival which is very periodic. As such, the next arrival of data can be easily predicted. Such systems can leverage the predicted arrival of data to optimize power consumption (e.g., by dozing off at periods in which data arrival is not expected, and listen for transmission during times in which data arrival is predicted).

To solve this problem, according to certain aspects, a device can perform time alignment for AR/VR links to ensure tight transmission time and to reduce latency. The wireless system transmission time can be negotiated to align with a cadence of the applications rate of generation of data. For example for video traffic, data corresponding to a single video frame is generated every frame interval (inverse of the frame refresh rate). The wireless subsystem can be made aware of the time offset and cadence of the arrival. The wireless subsystem can then negotiate with the receiver and the other systems in the network to ensure that the wireless transmission period is properly pipelined with the arrival of video data. The rendering, compression, wireless transmission, decompression and display all fall in place and fit tightly with each other to ensure that latency does not exceed the pipeline latency of the system. However, if the wireless system cannot guarantee data transfer/transmission in the assigned/intended slot, the rest of the pipeline gets pushed out, which leads to latency and power consumption issues.

For a single AR/VR wireless link, in absence of other external interference or other AR/VR link, the scheme of aligning the wireless transmission to the system timing provides all the benefit that time alignment can achieve. When there are multiple links sharing the same wireless medium or channel, the wireless subsystem may negotiate with other links, or operate with (e.g., in accordance with) a coordinator, to ensure that each link has a corresponding wireless transfer window, which then ensures that the wireless system can provide improved latency performance to the above layers.

One issue that may arise as a result of aligning wireless transfer windows based on an application or device is that each application or device may have requirements, configuration settings, etc., which could be different from that of the wireless subsystem. Additionally, even where such requirements and settings are the same, the timing between the wireless layer and application layer may drift relative to other applications or devices, and aligning the wireless layer timing based on the application timing may then cause the previously disjoint (non-overlapping) wireless transfer windows to drift and overlap with each other, thereby causing interference and degradation in performance, which then leads to poor latency performance and power consumption. To avoid such issues, the systems and methods described herein may implement a master timing control at the wireless layer, and then flow this timing upwards through the stack or layers to the applications. For example, an application at the application layer may modify its frame generation cadence to align with the opportunity to transmit at the wireless transfer window. Similarly, a receiver application for a display may adjust the frame rate of the display to align with this cadence. Such implementations and embodiments may ensure optimal latency performance.

The systems and methods described herein can time, adjust, delay, advance and/or schedule various processes or blocks involved in the generation or rendering, transmission, and display of a frame (rendering, warping, compression, etc.) such that the frame data arrives at the wireless subsystem for transmission just in time within the wireless transfer window. Such implementations and embodiments may similarly be applied to audio traffic, inertial measurement unit (IMU) traffic, or other data relating to AR/VR applications, which is for instance periodic and/or deterministic. Similarly, where multiple applications generate traffic within the same device, such applications may all be aligned with the wireless transfer window.

Some systems may have devices/applications which do not have the same basic frame rate or common parameters which allow an application to fit into a common wireless schedule.

In such implementations, the system may perform negotiation by applying one or more predefined rules to limit or minimize overall latency. Such rules may relate to selecting one of the frame rates, identifying or determining a common frame rate, etc.

In one approach, a device, which may include a console or a head wearable display (HWD), may determine a wireless transfer window corresponding to a wireless data transmission between the HWD and the console. The device may determine the wireless transfer window based on negotiation with other devices located in a shared space. The device may determine the wireless transfer window based on an application or device cadence (e.g., at the device/application layer). The device may then determine one or more processes which are to be performed by the device to enable the wireless data transmission between the HWD and the console (e.g., within the wireless transfer window). The device may schedule the processes according to the wireless transfer window, and perform the wireless data transmission within the wireless transfer window responsive to the processes being performed.

Implementations in the present disclosure have at least the following advantages and benefits:

First, implementations in the present disclosure can provide coordination between the application layer and wireless layer to ensure that each of the layers are performing the tasks or processes needed to generate data at a suitable time for transmission. For example, rather than generating data on an ad hoc basis, the systems and methods described herein can generate data for transmission leading up to the slot or transfer window assigned to the particular device. Such embodiments reduce overall latency by limiting any wait time between generation and transmission.

Second, implementations of the present disclosure can provide coordination between application layers and wireless layers of a plurality of devices to ensure that each device using a shared network medium are adhering to their respective time slots or transfer/transmission windows. For example, by implementing predetermined rules and negotiations between application and wireless layers, the systems and methods described herein can provide for a global or master timing control across all devices. Such systems and methods provide for tight coupling and adherence to the timing for each of the devices, and thereby reduce overall latency and improves user experience, even in a crowded network medium.

Third, implementations in the present disclosure can provide reduced power consumption in comparison to other systems and methods by such coordination. For example, because a device may become aware of timing to meet a particular slot or transfer window, the device may doze off when tasks are not required to be performed. Rather than generate data for transmission on an ad hoc basis, the device can time the generation of data, and sleep modes, around the wireless transfer window, thereby reducing overall power consumption.

Various other benefits are described in greater detail below.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HWD 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
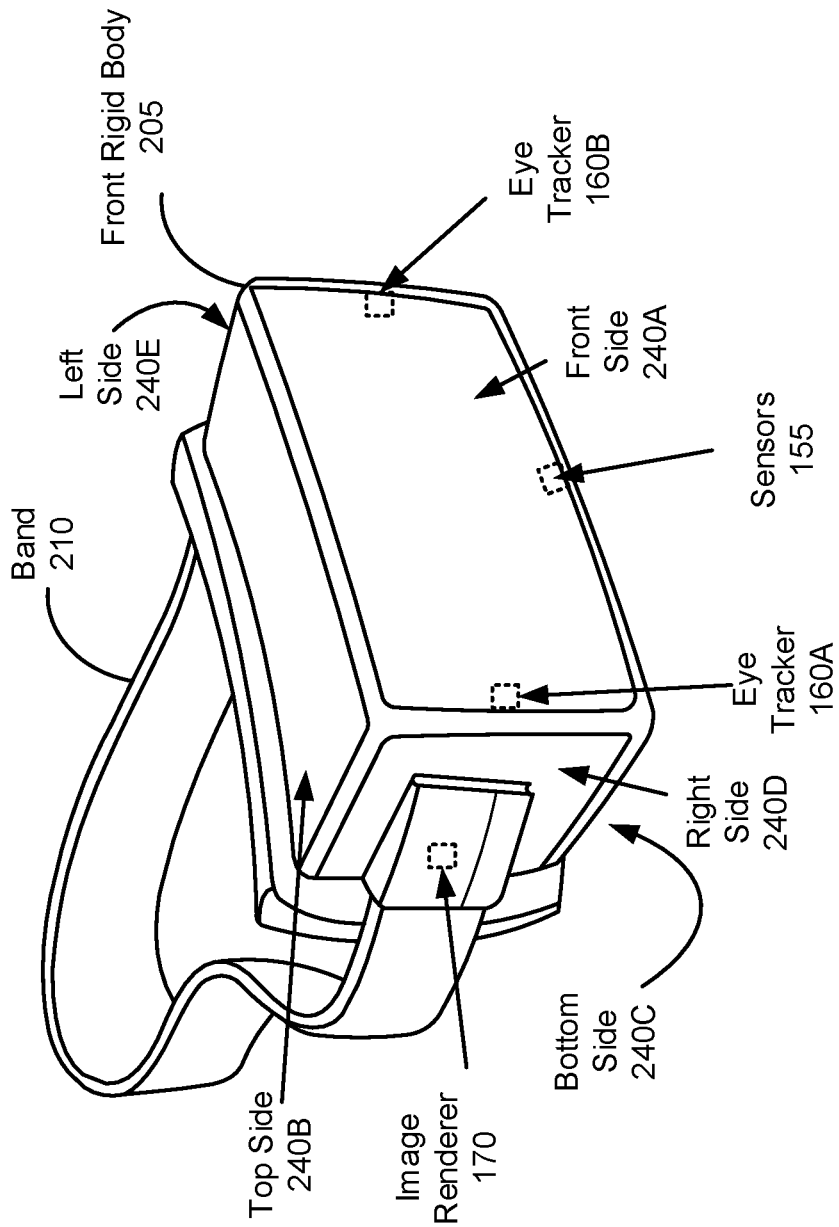
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
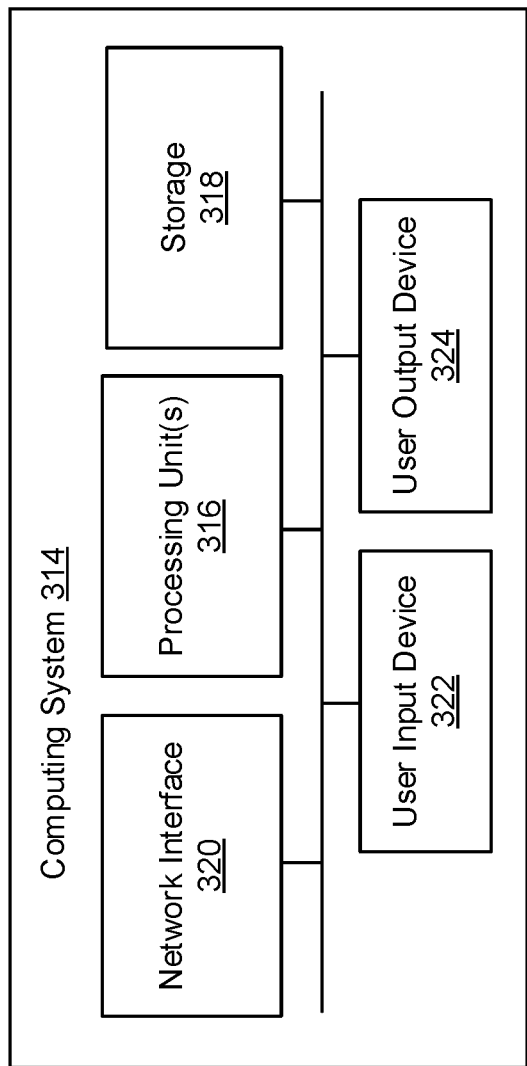
FIG. 3 is a block diagram of a computing environment according to an example implementation of the present disclosure.

FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Various operations described herein can be implemented on computer systems having the configuration that is same as or similar to that of the computing system 314.

Figure 4:
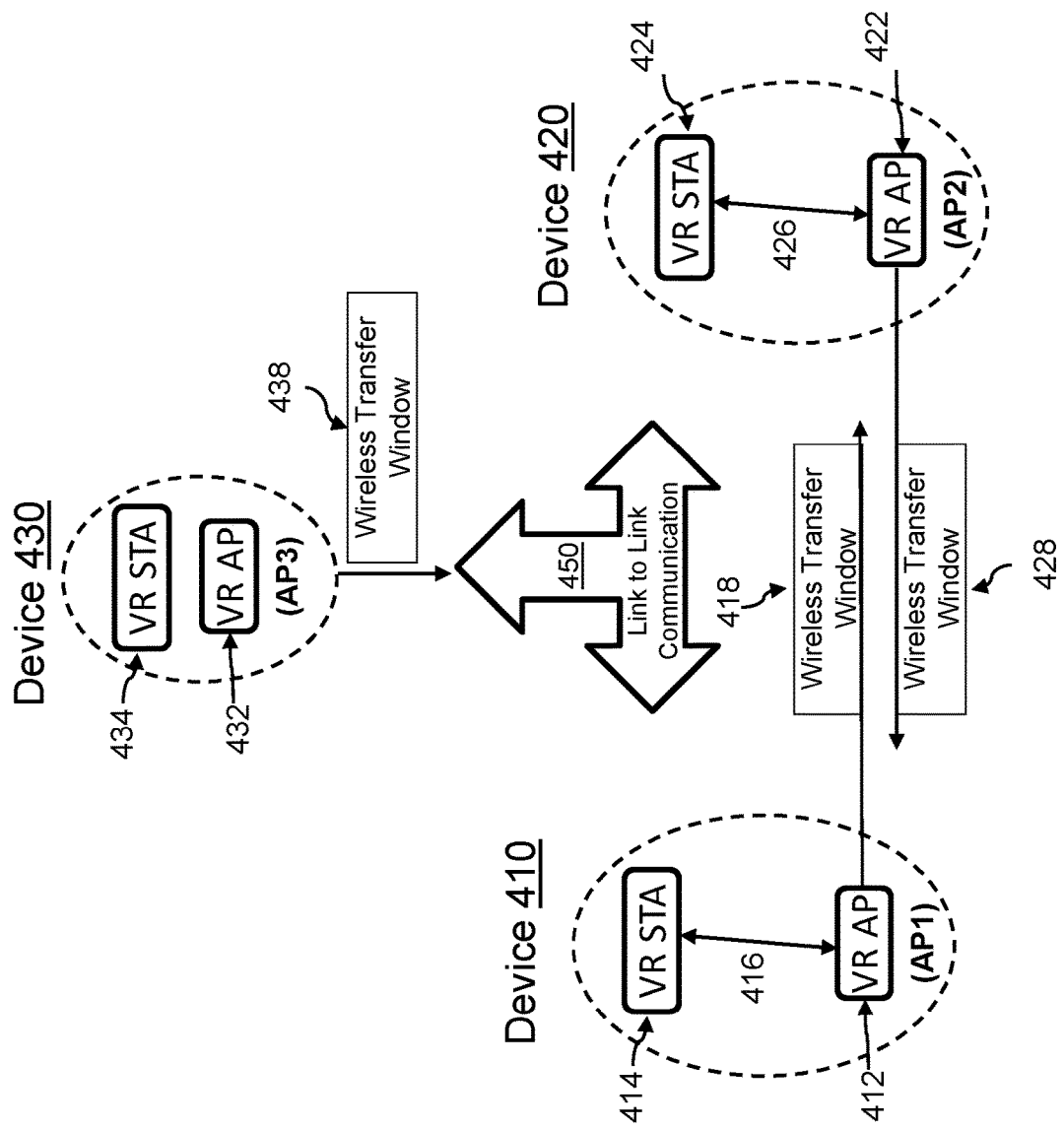
FIG. 4 is a diagram of a system environment including artificial reality links, according to an example implementation of the present disclosure.

FIG. 4 is a diagram of a system environment including a plurality of artificial reality links, according to an example implementation of the present disclosure. Referring to FIG. 4, an artificial reality wireless link 1 (denoted by device 410) includes a pair of an AP1 (access point) 412 and a station 414 communicating 416 with AP1 via a shared wireless medium 450 (e.g., the same wireless channel in a wireless network). Here, the wireless network may be, but not limited to, wireless local area network (LAN), wireless personal area network (PAN), wireless ad hoc network, or wireless metropolitan area network (MAN). An artificial reality wireless link 2 (denoted by device 420) includes a pair of an AP2 (access point) 422 and a station 424 communicating 426 with AP2 via the shared wireless medium 450. Similarly, an artificial reality wireless link 3 (denoted by device 430) includes a pair of an AP3 (access point) 432 and a station 434. In some implementations, each of AP1, AP2, AP3 may be an artificial reality supporting console, and the stations 414, 424, 434 may be HWDs respectively communicating with AP1, AP2, AP3. In some implementations, artificial reality links 410, 420, 430 may communicate with each other on the same or shared wireless medium 450 (e.g., the same wireless channel in a wireless LAN).

Figure 5:
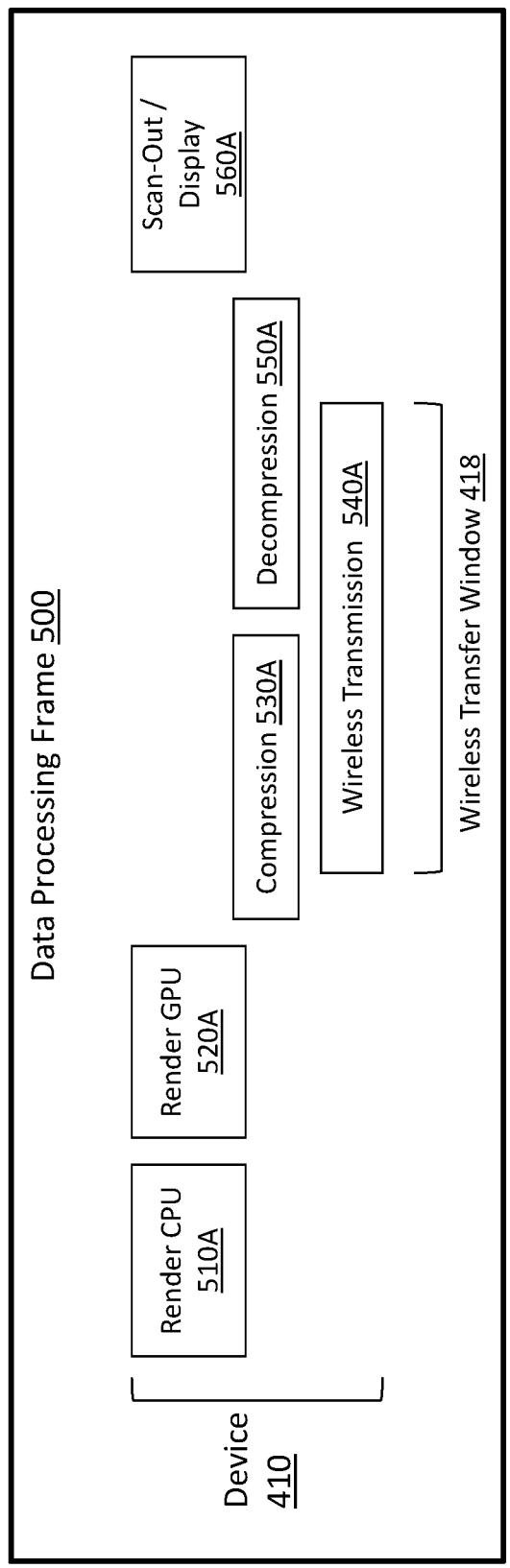
FIG. 5 is a diagram of a data processing frame for a device of the system of FIG. 4, according to an example implementation of the present disclosure.

FIG. 5 depicts a representation of a series of processes scheduled based on a wireless transfer window, according to an example implementation of the present disclosure. FIG. 5 shows an example data processing frame 500 which corresponds to a wireless transfer window 418 of the device 410 in FIG. 4. In some embodiments, the devices 410-430 may be configured to schedule the processes included in the data processing frame 500 at the application layer or stack based on the wireless transfer window 550 negotiated at the wireless layer or stack. For example, and in embodiments in which a plurality of devices 410-430 use the shared wireless medium 450, the devices 410-430 may be configured to negotiate their respective wireless transfer windows such that the wireless transfer windows for each of the devices 410-430 are independent of one another (e.g., such that the wireless transfer windows for each device 410-430 do not overlap with the wireless transfer windows of the other devices 410-430). As described in greater detail below, and in some embodiments, the device 410-430 may be configured to schedule the wireless transfer window according to a cadence (such as a refresh rate, or transmission rate) of the device 410-430 at the application layer or stack.

The data processing frame 500 may include or span a series of processes which are performed by the device 410, e.g., by components of the device 410. For example, some processes may be performed by the access point AP1 of the device 410, while other processes may be performed by the station 412 of the device 410. Additionally, some processes may be performed prior to the wireless transmission, some processes may overlap or be performed concurrently with the wireless transmission, and some processes may be performed following the wireless transmission. The data processing frame 500 is shown to include a render central processing unit (CPU) process 510A, a render graphics processing unit (GPU) process 520A, a compression process 530A, a wireless transmission process 540A, a decompression process 550A, and a scan-out (or display) process 560A. While these processes are described with reference to FIG. 5, it is noted that additional processes may be added to the data processing frame 500 for performance by the device 410. Similarly, some processes may be performed in parallel, and some processes may be foregone or absent in some embodiments. Accordingly, the present disclosure is not limited to the particular processes shown in FIG. 5.

The device 410-430 may be configured to set, negotiate, provide, or otherwise schedule the series of processes included in the data processing frame 500 in accordance with the wireless transfer window. In some embodiments, the device 410-430 may be configured to schedule the processes at the application layer or stack in accordance with the wireless transfer window negotiated at the wireless layer or stack between the devices 410-430 (e.g., via the shared wireless medium 450. In some embodiments, the device 410-430 may be configured to negotiate, set, or otherwise schedule the wireless transmission at the wireless layer or stack in accordance with a cadence of the processes performed at the application layer or stack. Each of these embodiments are described in greater detail below.

Figure 6:
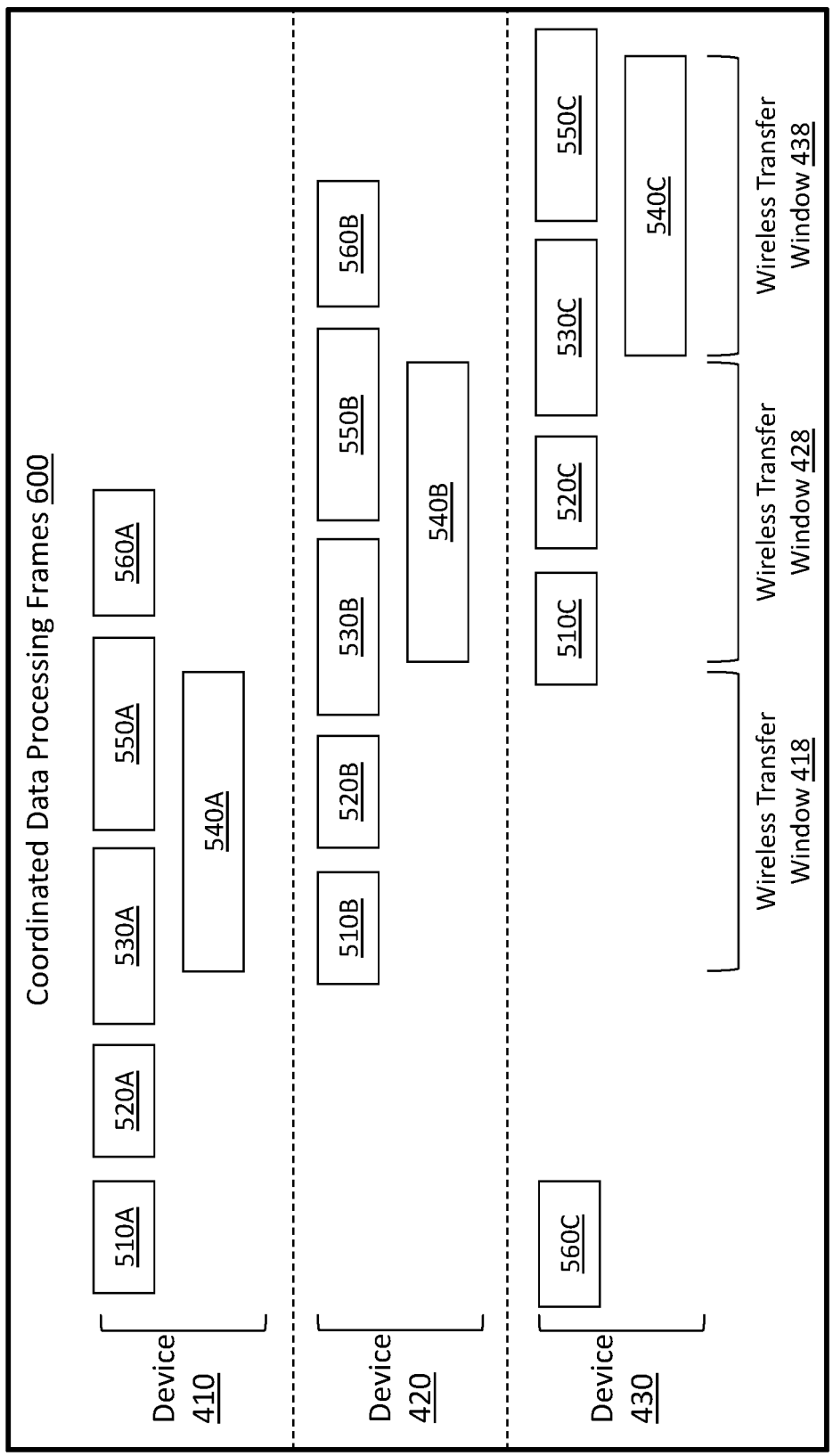
FIG. 6 is a diagram of a coordinated data processing frame for the system of FIG. 4, according to an example implementation of the present disclosure.

Referring now to FIG. 4 and FIG. 6, in some implementations, AP1 may communicate, negotiate, share or otherwise provide information about a wireless transfer window 418, 428, 438 (also referred to as wireless transfer windows 418-438) via the shared wireless medium 450, so that AP2 can detect or receive information about the wireless transfer windows 418-438. Specifically, FIG. 6 depicts coordinated processing frames 600 between the devices 410-430 around their respective wireless transfer windows 418-438. For example, AP1 may broadcast a beacon frame via a wireless channel in an 802.11 Wi-Fi network. Similarly, AP2 (and AP3) may communicate a wireless transfer window 428 (e.g., broadcast a beacon frame) via the shared wireless medium 450 (e.g., a wireless channel in an 802.11 Wi-Fi network) so that AP1 can detect the wireless transfer window 428. In some implementations, instead of broadcasting wireless transfer windows, AP1, AP2, AP3 may each communicate wireless transfer windows 418-438 to each other using unicast (to a particular destination device) or multicast (to a set of destination devices). As described in greater detail below, each of the devices 410, 420, 430 may schedule a series of steps, processes, etc,. based on their respective wireless transfer windows 418-438.

Each of the devices 410-430 may be configured to determine the wireless transfer window 418-438 for the respective device 410-430. Each wireless transfer window 418-438 may correspond to a wireless data transmission between the access point and the station (e.g., via the shared wireless medium 450). In some instances, such as where a single device is using the wireless medium 450 (e.g., where multiple devices are not co-located in a space), the device may have a wireless transfer window which is not based on any other windows. However, where multiple devices 410-430 are using a shared wireless medium 450 (e.g., multiple devices are co-located in a space), each of the devices 410-430 may have a respective wireless transfer window which is based on (or scheduled or coordinated according to) the wireless transfer windows of other devices 410-430. In other words, the wireless transfer windows 418-438 may in some embodiments be independent of one another, as shown in FIG. 6. In some embodiments, the devices 410-430 may be configured to negotiate their respective wireless transfer windows 418-438 such that the wireless transfer windows 418-438 are independent of one another. The devices 410-430 may be configured to negotiate their wireless transfer windows 418-438 via coordination.

The device 410-430 may be configured to set, negotiate, provide, or otherwise schedule the series of processes included in the data processing frame 500 in accordance with the wireless transfer window 418-438. In some embodiments, the device 410-430 may be configured to schedule the processes at the application layer or stack in accordance with the negotiated wireless transfer window for the device 410-430. For example, the device 410-430 may be configured to determine, for downlink communications (from the access point AP to the station), one or more processes to be performed prior to the downlink wireless transmission. Such processes may be, for example, rendering CPU/GPU to provide a user interface for displaying. Such processes may also include, for example, compression prior to transmission. As another example, the device 410-430 may be configured to determine, for uplink communications (from the station to the access point AP), one or more processes to be performed prior to the downlink wireless transmission. Such processes may be, for example, data collection (e.g., from an inertial measurement unit IMU), compression, etc.

The device 410-430 may be configured to schedule one or more of the processes according to the wireless transfer window of the device 410-430. The device 410-430 may be configured to schedule the processes based on a direction of (e.g., uplink or downlink) wireless transmissions. The device 410-430 may be configured to schedule one or more of the processes which enable the wireless transmission to occur prior to the wireless transfer window. As such, the device 410-430 may be configured to align a cadence of the processes with the wireless transmission window to minimize any delay or latency between content being generated and content being transmitted and rendered.

The device 410-430 may be configured to schedule one or more console processes for uplink wireless transmissions according to the wireless transfer window 418-438 of the device 410-430. The device 410-430 may be configured to schedule the console processes for performance prior to the wireless transfer window 418-438. For example, the device 410-430 may be configured to schedule performance of the processes at the application layer according to the wireless transfer window 418-438. In the example shown in FIG. 5, the device 410 may be configured to schedule the render CPU process 510A (e.g., to be performed by the CPU of the console), render GPU process 520A (to be performed by the GPU of the console), and compression process 530A (to be performed by the CPU, or another processing unit 316, of the console) around the wireless transfer window 418. Each of these processes may generate data, and compress the data, which is to be transmitted, sent, communicated, or otherwise provided by the console (or access point AP) to the HWD (or station). The CPU, GPU, and/or other processing units 316 may be configured to perform the processes at their scheduled time, as set by the device 410-430, leading up to the wireless transmission. Accordingly, the device 410-430 may be configured to schedule various processes involved in the generation of a frame (e.g., for rendering at the HWD) such that the frame data arrives at the wireless subsystem (for transmission in the wireless transfer window 418-438), e.g., just in time to be picked up for transmission in the wireless transfer window 418-438.

In some embodiments, the device 410-430 may be configured to schedule one or more HWD processes for the uplink wireless transmissions according to the wireless transfer window 418-438 of the device 410-430. In the example shown in FIG. 5, the device 410-430 may be configured to schedule a decompression process 550A and scan-out or display process 560A for the HWD (or station) to be performed following the wireless transmission within the wireless transfer window 418-438. The device 410-430 may be configured to schedule the HWD processes such that the HWD is prepared to perform such processes upon receipt of the wireless transmission 540A. Accordingly, the device 410-430 may be configured to schedule processes on both sides of the wireless transfer window 418-438. As such, the device sets, modifies, adjusts, or otherwise schedules a frame generation cadence of an application to align with the wireless transfer window, and schedules a frame rate of display for a receiver application to adjust the frame rate of the display to align with the wireless transfer window. Such embodiments ensure optimal latency performance by scheduling generation and rendering of content around the wireless transfer window.

In some embodiments, some of the processes may at least partially overlap the wireless transmission 540A and, correspondingly, the wireless transfer window 418. For example, as shown in FIG. 5, the compression process 530A and decompression process 550A may at least partially overlap the wireless transmission 540A. Such embodiments may reflect that, as data generated via the render CPU and render GPU processes 510A, 520A is compressed, such data may be transmitted in real-time during the wireless transfer window 418. Similarly, the HWD may be configured to perform the decompression process 550A as compressed data is received from the console. It is noted that, while the wireless transmission 540 is shown to span the wireless transfer window 418-438, in some embodiments, multiple wireless transmissions 540 may be exchanged between the console and HWD within the wireless transfer window 418. For example, both uplink and downlink transmissions may occur during/within the wireless transfer window 418.

Similar to uplink transmissions, the device 410-430 may be configured to schedule one or more HWD (and/or console) processes for downlink wireless transmissions according to the wireless transfer window 418-438 of the device 410-430. The device 410-430 may be configured to schedule a data collection process (e.g., from an IMU), a compression process, etc. for which the HWD is to perform prior to the wireless transfer window 418-438. Similarly, the device 410-430 may be configured to schedule a decompression process, an analysis or read process for which the console is to perform following the wireless transfer window 418-438.

Figure 7:
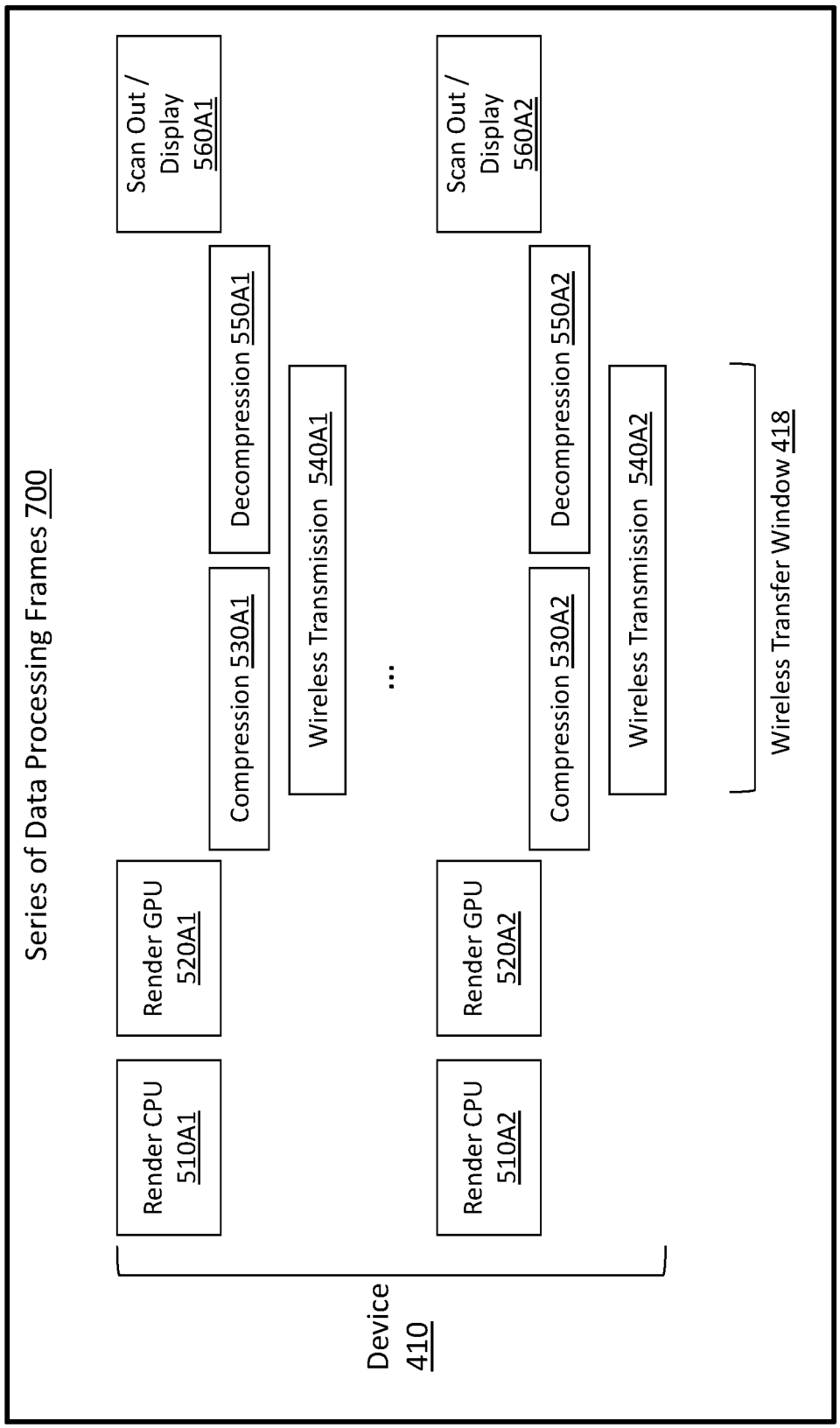
FIG. 7 is a diagram of a series of data processing frames for the device of FIG. 5, according to an example implementation of the present disclosure.

In some embodiments, the device 410-430 may be configured to schedule processes for a plurality of applications executing on the device 410-430 according to the wireless transfer window 428. Referring now to FIG. 7, depicted is a series of data processing frames 700 of the device 410. As shown in FIG. 7, the device 410 may be configured to implement a first set of processes 510A1-560A1 according to the wireless transfer window 418 and a second set of processes 510A2-560A2 according to the wireless transfer window 418. In some embodiments, the first set of processes 510A1-560A1 may be performed for a first application (e.g., executing on the device 410) and the second set of processes 510A2-560A2 may be performed for a second application. The device 410 may be configured to schedule each of the sets of processes according to the wireless transfer window 418. In some embodiments, the device 410 may be configured to execute the first set of processes at a first time instance of the wireless transfer window and execute the second set of processes at a second time instance of the wireless transfer window. For example, the device 410 may be configured to execute the first set of processes and perform the wireless transmission during the wireless transfer window, then execute the second set of processes and perform the wireless transmission during a subsequent wireless transfer window. Such embodiments may provide for multiple applications executing concurrently on the device 410.

According to such embodiments, the device 410-430 may adjust a cadence, schedule, or processing routines to align with, coincide with, or otherwise correspond to the wireless transfer window 418-438 of the device 410-430. It is noted that, where a single device 410 is located in a space (e.g., such that the wireless medium 450 is not shared among other devices 420-430), the device 410 may schedule processing according to the wireless transfer window for the device 410. Such embodiments may decrease latency of the device 410 and thereby maximize benefits of time alignment for the device 410.

In some embodiments, the device 410-430 may be configured to adjust, schedule, modify, or otherwise set the wireless transfer window at the wireless layer or stack according to a cadence of the application or device at the application layer. In some embodiments, the device 410-430 may be configured to set the wireless transfer window based on other devices 410-430 located in the shared space. In some embodiments, the device 410-430 may be configured to schedule the wireless transfer window based on various parameters of the device 410-430 itself (e.g., parameters of the console and/or the HWD, for example).

In some embodiments, the devices 410-430 may be configured to transmit, send, share, or otherwise provide various parameters corresponding thereto via the shared wireless medium 450 to the other devices 410-430 (or other components of the same device 410-430). For example, similar to sharing the wireless transfer window 418, 428 described above, the devices 410-430 may be configured to share device parameters via the shared wireless medium 450 (e.g., broadcast a beacon frame via a wireless channel in an 802.11 Wi-Fi network). The parameters may include, for example, a device refresh rate, a transmission rate, etc. The refresh rate may be or define a rate or interval in which data generated by the device (such as a user interface to be displayed) is updated, refreshed, or otherwise generated. Similarly, the transmission rate may be a rate or interval in which data is transmitted from the access point to the station (and vice versa).

The devices 410-430 may be configured to apply one or more predefined rules to the parameters for setting, scheduling, modifying, or adjusting a wireless transfer window 418, 428 and corresponding stack of processes, as described above. For example, each device 410-430 may apply various predefined rules to the parameters received at the wireless layer of the respective device 410-430 for negotiating, setting, scheduling, or otherwise providing a corresponding wireless transfer window. The devices 410-430 may be configured to schedule other steps or processes in the stack based on the negotiated wireless transfer window for the device.

In some embodiments, the devices 410-430 may be configured to determine an application or device cadence for the device 410-430. The application (or device) cadence may include a refresh rate, a transmission rate, etc. of the device 410-430. Some applications may have a cadence or requirements which are different from other applications executing on the same device 410-430. Similarly, some devices 410 may have components which have different cadences or requirements. For example, a third party HWD may have a refresh rate which is different from a transmission rate of a console. Such embodiments may result in an otherwise aligned wireless transfer window to drift and cause overlap, thereby causing interference and degradation in error performance, which then leads to poor latency performance and power consumption.

The devices 410-430 may apply one or more rules to the parameters at the application or device layer for scheduling, adjusting, modifying, or otherwise setting/scheduling the wireless transfer window at the wireless layer. In this regard, the device 410-430 may be configured to set the wireless transfer window according to parameters for the device 410-430 at the application or device layer. In some embodiments, the device 410-430 may be configured to negotiate the wireless transfer window based on the parameters corresponding to the application or device layer. The device 410-430 may be configured to negotiate the wireless transfer window to minimize overall latency.

In some embodiments, the devices 410-430 may be configured to set the wireless transfer window according to a refresh rate of the device 410-430 (or application). For example, where one component (or application) of the device 410 requests a 60Hz refresh rate while another component (or application) of the device 410 requests a 90 HZ refresh rate, both requests are incapable of being fulfilled without a resulting overlapping and corresponding latency occurring. The device 410-430 may be configured to set the wireless transfer window by applying a predetermined rule to the requests from the component/application of the device 410. In some embodiments, the predetermined rule may be a default or predetermined selection of one of the refresh rates. For example, the device 410 may be configured to apply the predetermined rule to select one of the requested refresh rates (such as the higher refresh rate, or 90 Hz). The device 410 may be configured to negotiate, determine, or otherwise set the wireless transfer window according to the selected refresh rate from the plurality of requested refresh rates. Such embodiments may reduce or minimize overall latency.

In some embodiments, the device 410 may be configured to apply the predetermined rule to generate, compute, or otherwise determine a common refresh rate from both requested rates. In this regard, the device 410 may use a refresh rate which is different from both requested refresh rates. In some embodiments, the device 410 may be configured to determine the common refresh rate by identifying a greatest common factor (GCF) for both of the requested refresh rates. Continuing the example described above, the device 410 may determine the common refresh rate by identifying the GCF for both 60 Hz and 90 Hz, or 30 Hz. The device 410 may thus be configured to set a refresh rate according to the common refresh rate. The device 410 may be configured to negotiate, determine, or otherwise set the wireless transfer window 418 according to the common refresh rate.

While described above with respect to refresh rate, it is noted that the device 410 may similarly apply predetermined rules to a transmission rate to modify, select, or otherwise set the wireless transfer window. Such embodiments may limit overall latency while exchanging data between the devices.

Figure 8:
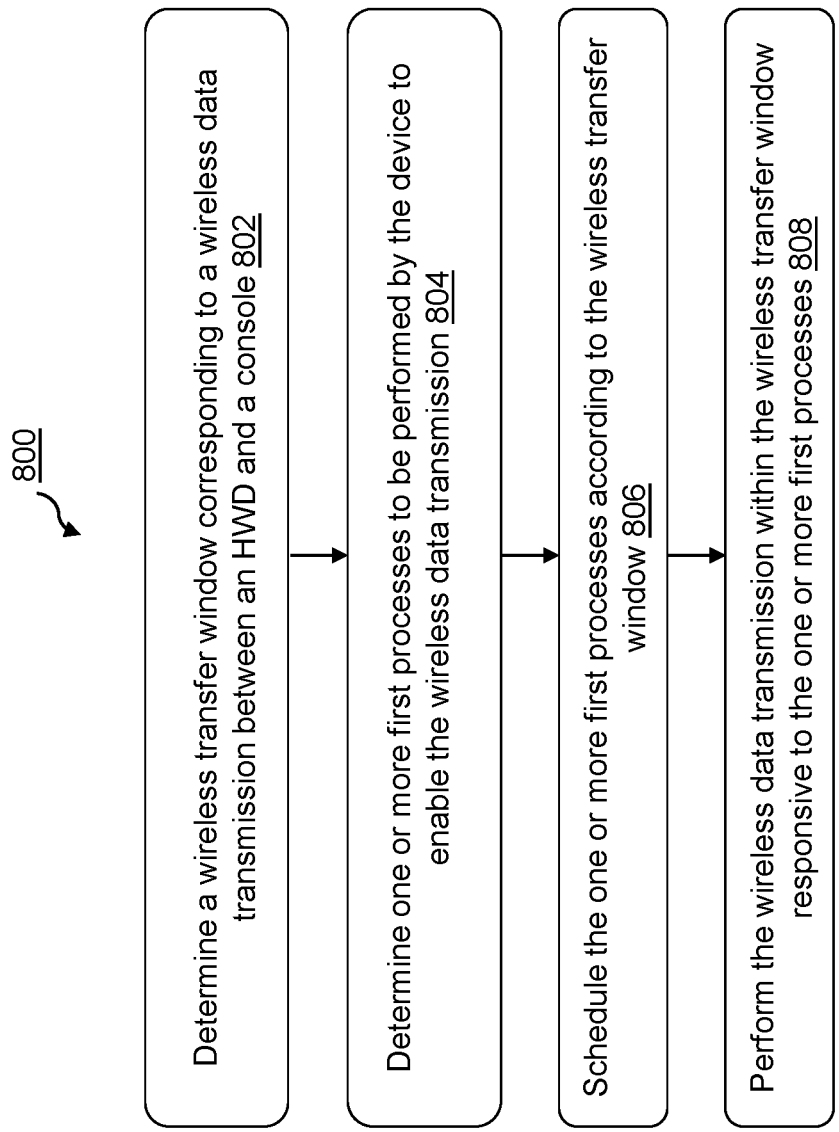
FIG. 8 shows a flow diagram of an example process of time alignment, according to an example implementation of the present disclosure.

Referring now to FIG. 8, depicted is a flowchart showing a method 800 of time alignment in AR/VR applications, according to an illustrative embodiment. The method 800 may be performed by the devices 410-430 described above, such as the access point(s), station(s), and so forth. As a brief overview, at step 802, a device may determine a wireless transfer window corresponding to a wireless data transmission between an HWD and a console. At step 804, the device may determine one or more first processes to be performed by the device to enable the wireless data transmission. At step 806, the device may schedule the one or more first processes according to the wireless transfer window. At step 808, the device may perform the wireless data transmission within the wireless transfer window responsive to the one or more first processes.

At step 802, a device may determine a wireless transfer window corresponding to a wireless data transmission between an HWD and a console. In some embodiments, the device may determine the wireless transfer window based on a negotiated window between additional devices using a shared network. The devices may negotiate the wireless transfer windows such that each respective wireless transfer window is independent of other wireless transfer windows. In some embodiments, the devices may determine the wireless transfer window based on data or parameters from an application or device layer of the device.

In some embodiments, the device may transmit parameters to other devices located in a shared space (and using a common or shared network) for scheduling the other device's wireless transfer window. For example, the device may transmit parameters corresponding to a refresh rate or a transmission rate. Similarly, each device may receive device-specific refresh or transmission rates for the components (or applications) of the device. The device may use those parameters for scheduling, determining, setting, or otherwise identifying a wireless transfer window. For example, the device may apply a predefined or predetermined rule to the refresh rate or transmission rate (of the other devices/components/applications) for scheduling the wireless transfer window. The predefined rule may be selecting a particular refresh or transmission rate from the parameters received by the device. The predefined rule may be determining or identifying a common refresh or transmission rate from the parameters received by the device.

At step 804, the device may determine one or more first processes to be performed by the device to enable the wireless data transmission. The device may determine the first processes which are to be performed for enabling the wireless data transmission (e.g., the uplink wireless data transmission or downlink wireless data transmission). The device may determine processes which are to be performed by the HWD (e.g., for downlink wireless transmissions from the HWD to the console) to enable the wireless transmission. The device may determine processes which are to be performed by the console (e.g., for uplink wireless transmissions from the console to the HWD). The first processes may be steps or processes which are performed for generating the data which is transmitted during the wireless transfer window determined at step 802.

In some embodiments, the processes (such as the first processes) may be performed by the HWD of the device. The first processes may include, for example, a decompression process, a scan-out process, or a display process. As such, the processes may relate to, correspond to, or otherwise be associated with the display or rendering of a frame, interface, or other image. In some embodiments, the processes (such as the first processes) may be performed by the console of the device. In such embodiments, the first processes may include a render CPU process, render GPU process, a compression process, etc. As such, the processes may relate to, correspond to, or otherwise be associated with the generation of a frame, interface, or other image. In these embodiments, the first processes may be upstream or downstream from the wireless transfer window.

At step 806, the device may schedule the one or more first processes according to the wireless transfer window. In some embodiments, the device may schedule the first processes to occur prior to (or at least partially during) the wireless transfer window. Accordingly, the device may schedule processes which are to enable the wireless transmission during the wireless transfer window. The device may schedule the first processes prior to the wireless transmission such that the frame is generated prior to the wireless transfer window.

In some embodiments, the device may determine and schedule both first and second processes. In some embodiments, the second processes may correspond to a second application which is executing concurrently on the device. In such embodiments, the device may schedule the first processes for performance prior to a first wireless transfer window, and schedule the second processes for performance prior to a second (e.g., a subsequent) wireless transfer window. As such, the device may schedule the first and second processes to execute at alternating and/or adjacent wireless transfer windows to provide for two applications executing concurrently on the device. In some embodiments, the second processes may correspond to the upstream processes (e.g., corresponding to the first processes). As such, the device may schedule processes to be performed prior to the wireless transmission and may schedule processes to be performed following the wireless transmission. In such an embodiment, the device may schedule processes to be performed by a console for generation of a frame, and may schedule processes for a HWD for rendering of the frame generated by the console. The device may schedule such processes according to the wireless transfer window.

At step 808, the device may perform the wireless data transmission within the wireless transfer window responsive to the one or more first processes. The device may perform the wireless data transmission once the device has performed the first processes (e.g., to enable the wireless data transmission). For example, where the processes are to be performed by the console for generating data corresponding to a frame to be rendered, the device may perform the wireless data transmission during the wireless transfer window once the console generates the data for the frame.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
    determining, by a device comprising at least one of a console or a head wearable display (HWD), a wireless transfer window corresponding to a wireless data transmission of a frame between the HWD and the console;
    determining, by the device, one or more first processes of a data processing sequence for generating the frame to enable the wireless data transmission of the frame;
    scheduling, by the device, the one or more first processes according to the wireless transfer window; and
    performing, by the device responsive to the one or more first processes, the wireless data transmission within the wireless transfer window.

2. The method of claim 1, wherein the one or more first processes are performed by the HWD and comprise at least one of a decompression process, a scan-out process or a display process.

3. The method of claim 1, wherein the one or more first processes are performed by the console and comprise at least one of a render central processing unit (CPU) process, a render graphics processing unit (GPU) process, or a compression process.

4. The method of claim 1, further comprising negotiating, by the device, the wireless transfer window with one or more other devices.

5. The method of claim 1, wherein the device is a first device, the method further comprising:
    sending, by the first device, at least one of a refresh rate or a transmission rate of the first device to a second device, to schedule a wireless transfer window for the second device.

6. The method of claim 5, wherein the second device applies a predefined rule to the refresh rate or the transmission rate, to schedule the wireless transfer window for the second device.

7. The method of claim 1, further comprising:
    receiving, by the device, one or more parameters corresponding to an application or device layer of the device; and
    setting, by the device, the wireless transfer window according to the one or more parameters.

8. The method of claim 1, wherein the wireless transfer window is to be used for at least one application of a plurality of applications executing on the device.

9. The method of claim 1, wherein the one or more first processes correspond to a first application of a plurality of applications executing on the device, the method further comprising:
    determining, by the device, one or more second processes corresponding to a second application of the plurality of applications executing on the device, and wherein scheduling comprises:
    scheduling, by the device, the one or more first processes of the first application and the one or more second processes of the second application according to the wireless transfer window.

10. The method of claim 1, further comprising:
    determining, by the device, one or more second processes to be performed by one of the console or the HWD that is other than the device, following the wireless transfer window; and
    scheduling, by the device, the one or more second processes according to the wireless transfer window.

11. A device, comprising:
    at least one processor executing on at least one of a console or a head wearable display (HWD), the at least one processor configured to:
    determine a wireless transfer window corresponding to a wireless data transmission of a frame between the HWD and the console;
    determine one or more first processes of a data processing sequence for generating the frame to enable the wireless data transmission of the frame;
    schedule the one or more first processes according to the wireless transfer window; and
    perform, responsive to the one or more first processes, the wireless data transmission within the wireless transfer window.

12. The device of claim 11, wherein the one or more first processes are performed by the HWD and comprise at least one of a decompression process, a scan-out process or a display process.

13. The device of claim 11, wherein the one or more first processes are performed by the console and comprise at least one of a render central processing unit (CPU) process, a render graphics processing unit (GPU) process, or a compression process.

14. The device of claim 11, wherein the at least one processor is configured to negotiate the wireless transfer window with one or more other devices.

15. The device of claim 11, wherein the device is a first device, and the at least one processor is further configured to:
    send at least one of a refresh rate or a transmission rate of the first device to a second device, to schedule a wireless transfer window for the second device.

16. The device of claim 11, wherein the at least one processor is further configured to:
    receive one or more parameters corresponding to an application or device layer of the device; and
    set the wireless transfer window according to the one or more parameters.

17. The device of claim 11, wherein the wireless transmission window is to be used for at least one application of a plurality of applications executing on the device.

18. The device of claim 11, wherein the one or more first processes correspond to a first application of a plurality of applications executing on the device, and the at least one processor is further configured to:
    determine one or more second processes corresponding to a second application of the plurality of applications executing on the device, and wherein scheduling comprises:
    schedule the one or more first processes of the first application and the one or more second processes of the second application according to the wireless transfer window.

19. The device of claim 11, wherein the at least one processor is further configured to:
    determine one or more second processes to be performed by one of the console or the HWD that is other than the device, following the wireless transfer window; and
    schedule the one or more second processes according to the wireless transfer window.

20. A non-transitory computer-readable medium having one or more instructions embodied thereon, the one or more instructions, when executed by a processor, cause the processor to:
    determine, by a device comprising at least one of a console or a head wearable display (HWD), one or more parameters associated with at least one of an application layer or a device layer of the device;

set, by the device, a wireless transfer window according to the one or more parameters, the wireless transfer window corresponding to a wireless data transmission of a frame between the HWD and the console;

determine, by the device, one or more first processes of a data processing sequence for generating the frame to enable the wireless data transmission of the frame;

scheduling, by the device, the one or more first processes according to the wireless transfer window; and performing, by the device responsive to the one or more first processes, the wireless data transmission within the wireless transfer window.

\* \* \* \* \*